UNITED STATES PATENT OFFICE.

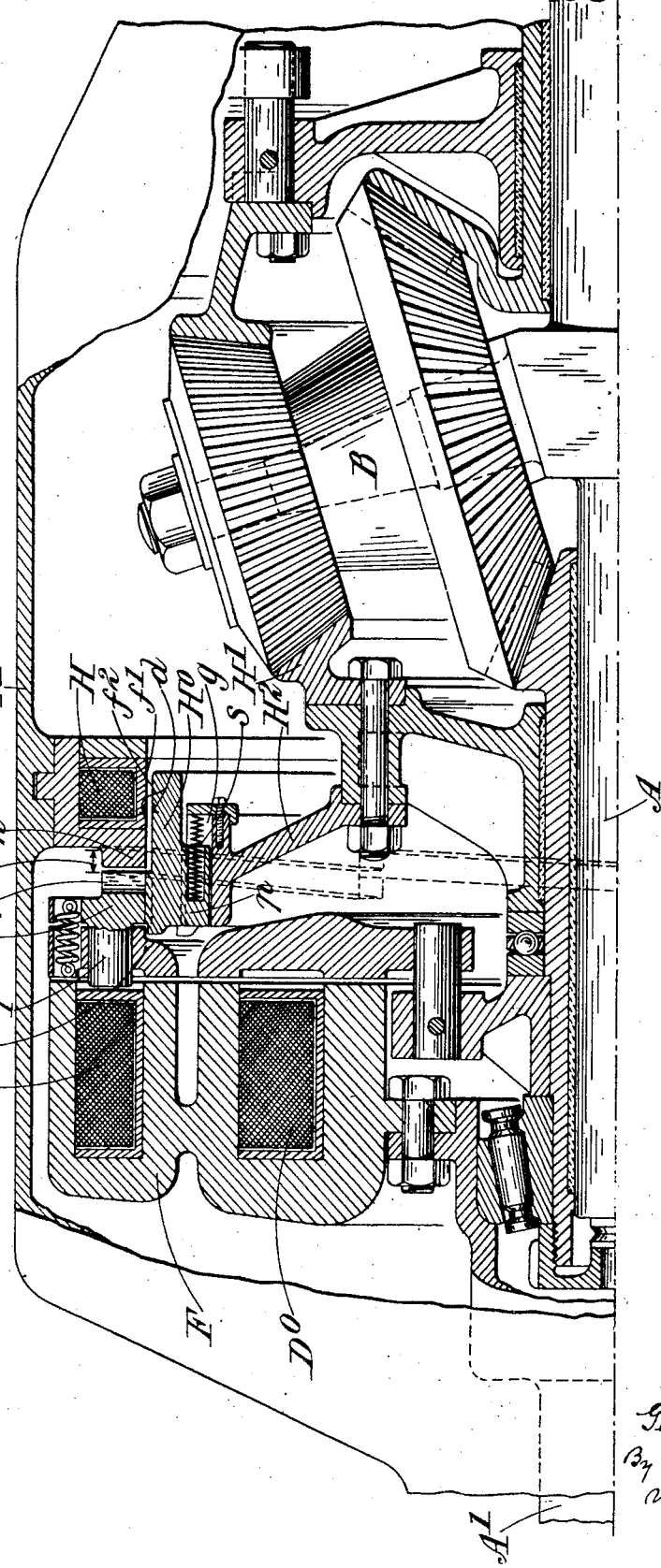

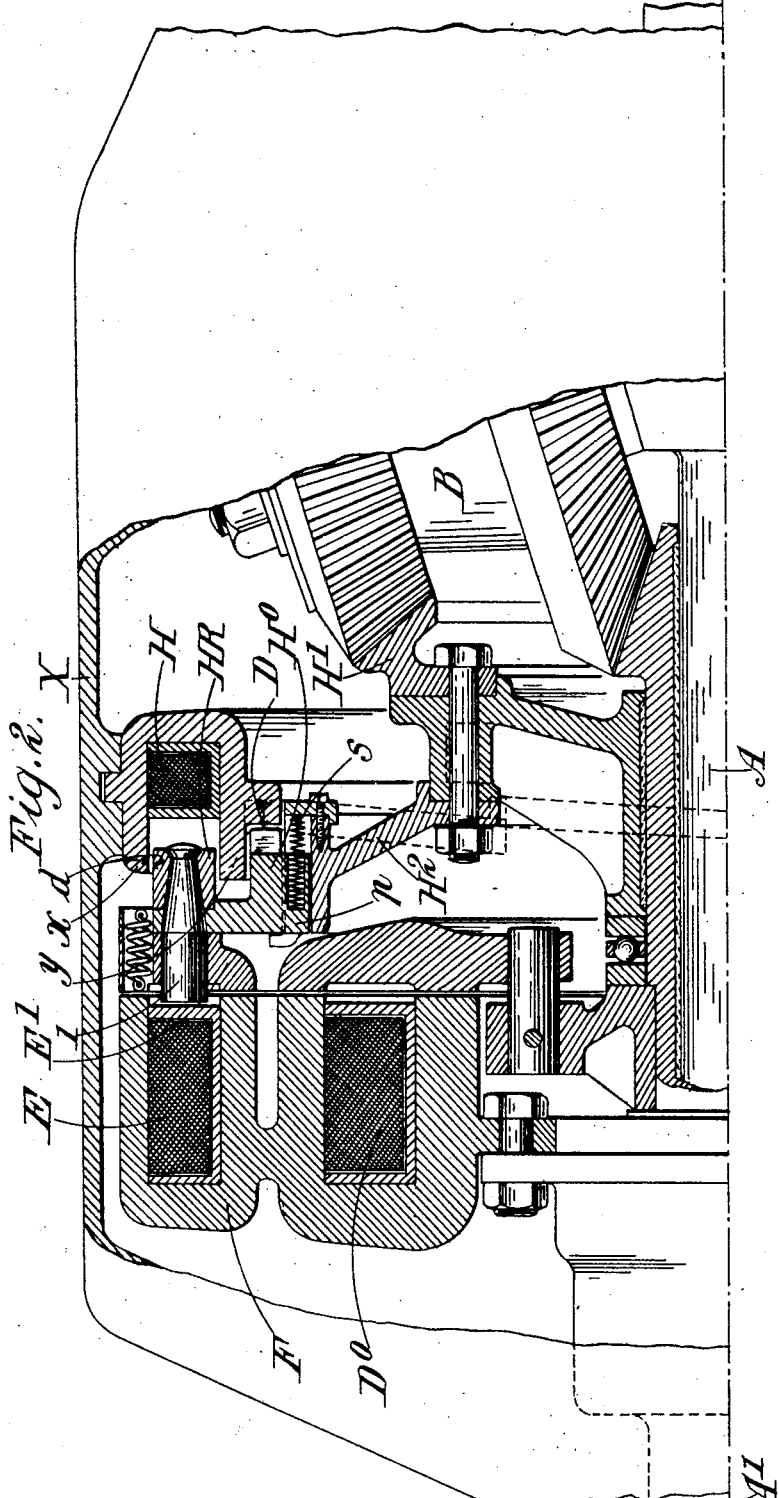

GEORGE POLLARD, OF LONDON, ENGLAND, ASSIGNOR TO THE MENCO-ELMA SYNDICATE LIMITED, OF LONDON, ENGLAND.

ELECTROMAGNETIC BRAKE FOR MOTOR ROAD-VEHICLES.

1,328,966.  Specification of Letters Patent.  Patented Jan. 27, 1920.

Application filed October 14, 1918. Serial No. 258,088.

*To all whom it may concern:*

Be it known that I, GEORGE POLLARD, a subject of the King of England, residing in London, England, have invented certain new and useful Improvements in Electromagnetic Brakes for Motor Road-Vehicles, of which the following is a specification.

Change-speed gears have been proposed in which the changes of speed have been brought about by the electro-magnetic operation of co-acting clutch-members or brake-members which have been toothed or otherwise so shaped that when engaged they should not be relatively rotatable; thus the relative rotation such as occurred between the co-acting members of electro-magnetic clutches when they engaged one another merely frictionally, was obviated (see for instance the electro-magnet 16, flange 33 constituting its armature, and the projections 17 and 18 constituting a dog-clutch or brake, in Figure 1 of the drawings appended to the specification of prior British Letters Patent No. 19755 of 1914 granted to George Pollard and The Menco-Elma Syndicate Limited, and see the non-slipping electro-magnetic clutches and brakes in the specifications of British Letters Patent Nos. 18,377 of 1914 and 10,539 of 1915, both granted to George Pollard and The Menco-Elma Syndicate Limited) but these non-slipping electro-magnetic clutches and brakes although they were advantageous in that they could not slip, were disadvantageous electro-magnetically, because the air-gap between the armature and the electro-magnet had to be as wide as the distance by which the co-acting members of the clutch or brake were apart when the clutch was not engaged, and consequently the electro-magnet had to be powerful enough to act across this wide gap. This involved the employment of a magnet which was very heavy, bulky and costly, and needed a large amount of current for its operation.

The present invention consists in the construction for a change-speed gear that is provided with co-acting clutch-members or brake-members toothed or otherwise so shaped that when engaged they cannot be relatively rotated and made to slip, of the combination of such co-acting clutch-members or brake-members with an armature fixed to one member and an electro-magnet fixed to the other, the armature and electro-magnet being characterized by a formation such that they have opposing faces parallel or approximately so to the path in which they move in relation to one another in the operation of bringing the members into engagement. The purpose of making the said opposing faces parallel, or approximately so, is that the air-gap measured perpendicularly to those faces, shall be of less width than the distance through which they are relatively movable in the operation of engaging or of disengaging the said clutch-members. By the employment of the present invention with the air-gap reduced as described in relation to the range of movement of the clutch or brake members, the clutch or brake can be operated with ease and certainty by an electro-magnet that is much smaller and lighter, much less expensive, and requires much less current than the electro-magnetic dog-clutches and brakes of the aforesaid earlier specifications.

In the accompanying drawings:—

Fig. 1 is a vertical central section of part of the upper half of a change-speed gear of the type illustrated in the drawings appended to prior British specifications Nos. 18,337 of 1914 and 10,539 of 1915 aforesaid; it shows a dog-brake with one form of electro-magnet applied thereto according to the present invention; and Fig. 2 is a view similar to Fig. 1 except that it has a different form of electro-magnet applied to it according to the present invention.

Like reference-letters indicate like parts throughout the drawings.

With reference first to Fig. 1, the gear comprises a shaft A and arms B, the arms intersecting the shaft and being fixed thereto, but not at right angles. The arms B in the example illustrated lean from the shaft A toward the flywheel F. The arms B receive motion from the motor (which motor actuates the shaft A¹ carrying the fly-wheel F) and transmit this motion to the driven shaft A as a direct drive and at five other speeds in forward running, and also transmit a single reverse speed, and effect the braking of the vehicle. The manner in which the gear as a whole is arranged to give these variations of speed is not of the present invention, but is explained in the earlier British specifications Nos. 18,337 of 1914 and 10,539 of 1915.

The aforesaid prior specifications also comprised electro-magnets such as D⁰, E and H herein; the magnet E operated to engage a wheel such as H¹ with the flywheel F, and the magnet H operated to engage the wheel H¹ with the said magnet, which being secured to the fixed casing X of the gearing could thus anchor the wheel H¹. In the construction illustrated in Fig. 1, the armature H⁰ of the electro-magnet H is arranged to slide in grooves $g$ formed in the flange of the disk H² which is virtually part of the wheel H¹, the armature engaging with these grooves by means of radial projections $p$ upon it parallel with the axis of the gear. Upon the part HR of the armature H⁰ are teeth $r$. Opposed to the teeth $r$ are teeth $h$ fixed on the side of the electro-magnet H. The teeth $r$ and the teeth $h$ constitute co-acting brake members fixed to the armature and to the electro-magnet respectively, and the armature and electro-magnet, both cylindrical, are characterized by a formation such that they have opposing faces $f^1$ $f^2$ respectively, which are annular and are parallel to the path, indicated by the dimension D, in which they move in the operation of bringing the brake members $r$ and $h$ into engagement, and are separated by an air-gap which measured perpendicularly to the faces, is of a dimension $d$, much less than the distance D aforesaid. Though the distance D through which the co-acting dog-tooth members $r$ and $h$ of the brake have to be relatively moved to bring the brake into action is the same as it would have to be in any similar dog-brake yet the air-gap $d$ is obviously much reduced in relation thereto.

In Fig. 2 the electro-magnet H is annular, with poles $x$ and $y$ between which is an annular recess into which the ring-armature H⁰ extends as shown when the brake is free, extending further into the annular recess when the brake is engaged. Teeth $r$ and $h$, as in the former case are fixed to the armature H⁰ and magnet H respectively. In this case, as in the former, the dimension $d$ is constant and is much less than the dimension D.

In the two cases chosen for illustration in the drawings the parts H⁰ and H² are provided with springs $s$ which tend to keep the brake disengaged and which are overcome by the magnetic pull when the brake is to be brought into engagement. Also, in the same two cases the electro-magnet E is one which is carried on a rotating part (F) and the electro-magnet H is one which is carried on a fixed part (the casing X) as in the change-speed gears of the aforesaid prior specifications.

Fixed in the part HR of each armature H⁰ are pins such as 1 on which the armature E¹ of the electro-magnet E can slide as is usual against the action of a spring; this is not of the present invention.

The present invention is applicable to any suitable electro-magnetic clutch or brake in a change-speed gear when the clutch or brake is provided with co-acting clutch-members so shaped that when engaged they cannot be relatively rotated.

I am aware than an armature and electro-magnet with opposing faces parallel or approximately so to the path in which they move in relation to one another in the operation of a clutch or brake are not of themselves new, and I make no claim to them.

What I claim as my invention and desire to secure by Letters Patent is:—

In a change-speed gear of the epicyclic type, the combination with a rotatable driving wheel, a rotatable member journaled coaxially with the latter and adapted to be rotated thereby, and a fixed annular electromagnet which is coaxial with the driving wheel and has lateral teeth, of a driven wheel which is journaled coaxially with said driving wheel and has an annular flange coaxial with the annular pole-face of said electromagnet, and a spring-controlled annular armature which is slidable on said flange in a direction parallel with the axis of the driving wheel, engages the flange to rotate therewith, engages the said member slidably in a direction parallel to said axis, is provided with teeth arranged to engage the former teeth, and has a cylindrical face that is arranged in close operative relation to the annular pole-face of the electromagnet in all positions of the armature, for the purpose specified.

In testimony whereof I affix my signature.

GEORGE POLLARD.